United States Patent [19]

Kobrehel

[11] 3,876,163
[45] Apr. 8, 1975

[54] SEAT BELT RETRACTOR SWITCH

[75] Inventor: Peter M. Kobrehel, Warren, Mich.

[73] Assignee: General Motors Corporation, Detroit, Mich.

[22] Filed: Nov. 16, 1972

[21] Appl. No.: 307,035

[52] U.S. Cl. ...... 242/107.4; 200/52 R; 200/61.58 B
[51] Int. Cl. .................. A62b 35/00; B65h 75/48
[58] Field of Search ........ 242/107.4, 107 SB, 107.2, 242/107.3, 107.5, 107.6, 107.7; 280/150 SB; 200/17 R, 61.58 B, 61.58 R, 52 R; 297/386, 388; 207/10 SB

[56] References Cited
UNITED STATES PATENTS

| | | | |
|---|---|---|---|
| 3,504,336 | 3/1970 | Boblitz | 242/107.4 |
| 3,667,698 | 6/1972 | Fisher | 242/107.4 |
| 3,693,147 | 9/1972 | Seo | 242/107.4 |

Primary Examiner—Stanley N. Gilreath
Assistant Examiner—John M. Jillions
Attorney, Agent, or Firm—Herbert Furman

[57] ABSTRACT

An automatic locking seat belt retractor includes a restraint belt wound on a rotatable reel and biased in a belt retracting direction. The reel end plates are provided with peripheral teeth engageable by a biased pawl to block movement of the reel in a belt extending direction. A rotatable cam plate is frictionally driven by the reel between two limit positions and includes two spaced shoulders alternately engageable with the pawl to block engagement of the pawl with the reel teeth. A plastic housing secured to an end wall of the retractor frame receives an output pinion of the reel which drives an internally toothed plastic sensor through an intermediate planet pinion. The sensor and pinion are rotatably mounted between spaced walls of the housing. The sensor includes a peripheral shoulder which is engageable with the pawl in the fully retracted position of the belt and during a portion of initial extending movement of the belt to block engagement of the pawl with the reel teeth. One of the housing walls includes two circumferentially spaced groups of radially spaced arcuate contact strips coaxial with the sensor. One strip of each group is connected to a source of power and the other strips, when connected to the one strip, complete various seat belt condition responsive circuits. The sensor includes reversely bent electrically connected contact fingers which slide along the contact strips to complete the various circuits in accordance with the arc of movement of the sensor and the length of belt extended.

5 Claims, 4 Drawing Figures

PATENTED APR 8 1975

3,876,163

SEAT BELT RETRACTOR SWITCH

This invention relates to a seat belt retractor switch and more particularly to a switch for an automatic locking retractor which completes one or more seat belt condition responsive circuits in accordance with the length of belt extended from the retractor.

Automatic locking retractors are well known and have been used in production for some years. Generally such retractors permit the belt to be freely extended to a predetermined length from a fully retracted position and thereafter a slight retraction of the belt and a subsequent slight extension of the belt automatically lock the belt against any further extension.

Certain seat belt condition-responsive systems for vehicles have been proposed. Such systems may visually or audibly indicate that a driver and one or more seated passengers have not fastened their restraint belts prior to starting of the engine, or that the driver and one or more seated passengers have fastened their belts behind them and have not unfastened the belts prior to leaving the vehicle. Such systems may also prevent the driver from starting the engine if his belt and one or more seated passengers' belts are not fastened. Such systems may also require a particular sequence of driver and passenger actions. Generally all such systems require some type of switch combined with the retractor to indicate whether or not a predetermined length of belt has been extended or has been extended and retracted.

The retractor switch of this invention is particularly intended for use with automatic locking retractors of the type wherein a reel driven rotatable sensor controls the engagement of a pawl with the reel to block extending movement of the belt. One such known retractor includes a rotatable sensor which is driven from the reel through a reduction gear arrangement and has a peripheral shoulder which blocks engagement of the pawl with the reel until a predetermined length of belt has been extended. The sensor is formed of dielectric material and is rotatably mounted within a housing of dielectric material. In accordance with this invention, the housing is provided with one or more groups of arcuately extending contact strips. The strips are spaced radially of each other and coaxial with the sensor, while the groups are spaced circumferentially of each other. One strip of each group is electrically connected to a source of power and the electrical connection of the one strip with the other strip of strips of the group may complete one or more seat belt condition responsive circuits. The sensor rotates relative to such strips and includes a plurality of reversely bent electrically interconnected contact fingers which move along respective contact strips as the sensor is driven by the reel to complete the circuit respective to the group during a predetermined arc of movement of the sensor. When there is more than one group of strips, the contact fingers sequentially complete and interrupt the various circuits. The switch is easily co-ordinated with the length of belt extended by setting the length of the contact strips. The switch is also easily packaged within the retractor without extensive modification.

It is therefore the primary object of this invention to provide a switch for an automatic locking retractor which completes and interrupts a seat belt condition responsive circuit in accordance with the length of belt extended from the retractor. It is another object of this invention to provide such a switch wherein a reel driven sensor rotates with respect to a group of spaced contact strips and includes contact fingers which move along the strips to complete a seat belt condition responsive circuit. It is a further object of this invention to provide such a switch wherein the contact strips are spaced radially of each other and coaxially of the sensor, with one strip of the group being connected to a source of power and being connected by the contact fingers with the other strips of the group, the number of strips of the group being selected in accordance with the number of circuits to be controlled by the group. It is yet another object of this invention to provide such a switch including a plurality of groups of strips, each group being spaced circumferentially of the others and completing a respective circuit when connected by the contact fingers.

These and other objects of the invention will be readily apparent from the following specification and drawings wherein.

Figure 1:
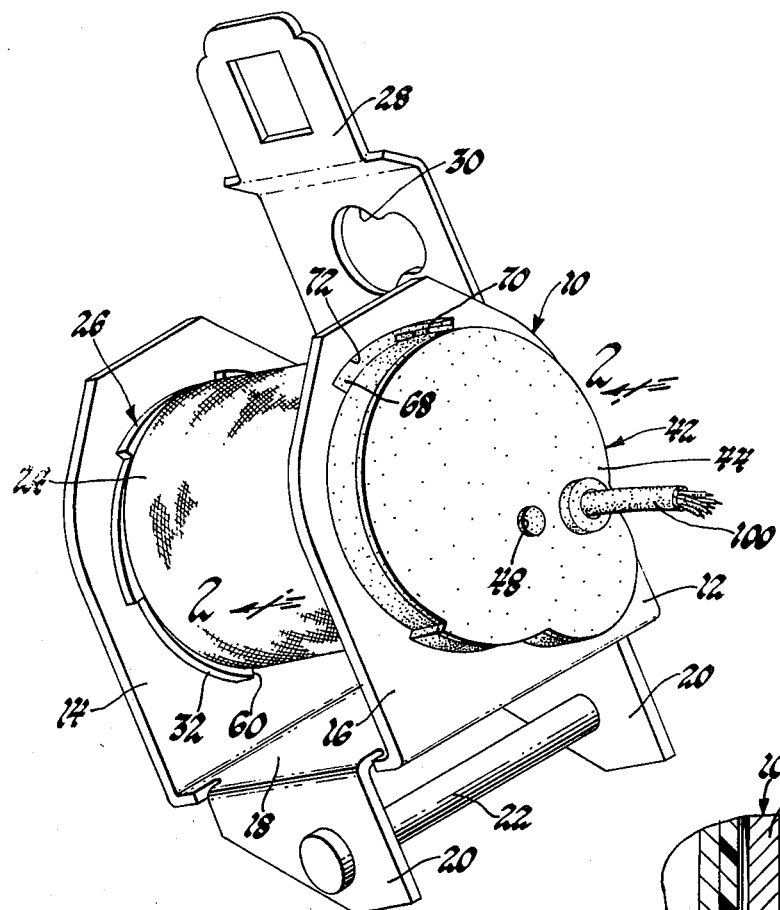
FIG. 1 is a perspective view of an automatic locking retractor embodying a switch according to this invention, with the belt being shown in fully retracted position.

Referring now to the drawings, an automatic locking retractor 10 of known type includes a generally U-shaped frame 12 having end walls 14 and 16 and a base wall 18. A pair of apertured integral ears 20 depend from the base wall 18 and mount a pin 22 to provide for mounting of the retractor on a vehicle body. The retractor 10 is currently used in production and is normally mounted outboard of the seat. A lap belt portion 24 is carried by the reel 26 of the retractor and includes a D-ring 28 at its one free end for connection to a conventional buckle at the free end of another lap belt portion to provide a lap belt for a driver or seated passenger. The D-ring 28 may include a keyhole 30 which receives a stud secured to a shoulder belt portion to provide a three-point belt assembly.

The reel 26 includes a rotatable shaft, not shown, and a pair of peripherally toothed end plates 32. The shaft is rotatably mounted in the end walls 14 and 16 of the frame and a coil spring, not shown, mounted within a housing secured to the outer side of wall 14 continually biases the reel in a retracting direction or clockwise as viewed in FIG. 1. The other end of the lap belt portion 24 is secured in a known manner to the reel shaft to wind the belt portion on the reel. Extension of the belt portion 24 rotates the reel in extending direction, counter-clockwise as viewed in FIG. 1, against the action of the spring biasing the reel in a retracting direction.

Figure 2:
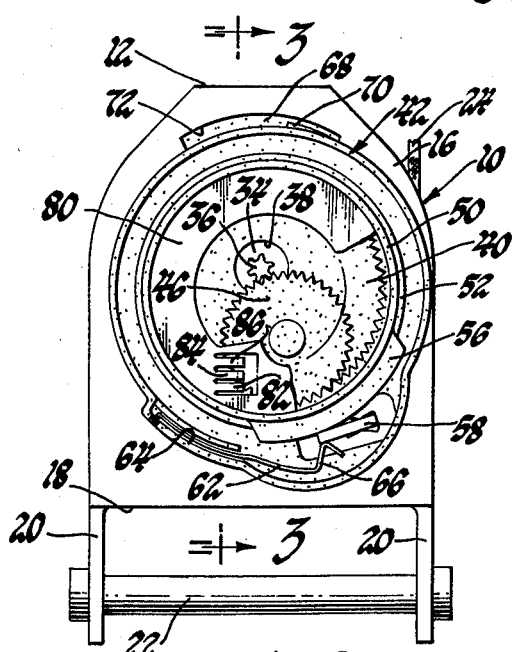
FIG. 2 is a broken away view taken generally along the plane indicated by the line 2—2 of FIG. 1.
Figure 3:
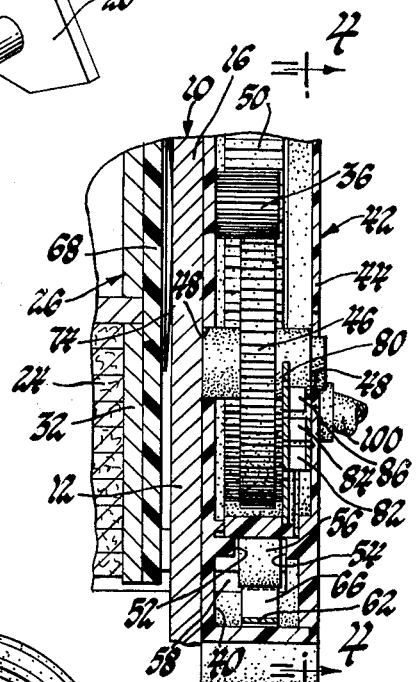
FIG. 3 is an enlarged partial sectional view taken generally along the plane indicated by line 3—3 of FIG. 2.

With particular reference to FIGS. 2 and 3, the end 34 of the reel shaft journaled in wall 16 includes a pinion or gear 36 which extends outwardly of the wall 16 through an opening 38 in one end wall 40 of a generally cylindrically shaped plastic housing 42 conventionally secured to the wall 16 such as by rivets or otherwise. A cover plate 44 provides the other end wall of the housing and is removably secured to the side wall of the housing by interlocking integral tongue and groove connections, not shown.

A pinion or planet gear 46 meshes with gear 36 and has its shaft ends journaled in aligned openings 48 in the wall 40 and cover 44 of housing 42. An internally toothed ring gear or sensor 50 meshes with gear 46 and is rotatably mounted within the housing 42 by an axially extending cylindrical rib 52 of wall 40 and a similar rib 54 of the cover plate 44. The sensor 50 includes a partially peripherally extending shoulder 56 for a purpose to be hereinafter described.

A pawl 58 has its ends received in generally dumbbell shaped openings in the end walls 14 and 16 so as to be mounted on the frame 12 for slight rotational movement relative thereto. The pawl conventionally includes a pair of integral teeth which can engage any pair of axially aligned teeth 60 of the reel end plates 32 to thereby block counterclockwise movement of the reel and extension of the belt portion 24. A leaf spring 62 has one end anchored in an integral slot 64 of the housing 42 and the other reversely bent end 66 thereof slidably engaging the pawl 58 to normally bias the pawl clockwise as viewed in FIG. 2 so that the pawl teeth are normally biased into the path of the teeth 60 of the reel end plates 32.

The retractor also includes a plate or second sensor 68 which is rotatably received on the reel shaft between one of the end plates 32 and the wall 16, FIG. 3. The sensor 68 includes a lateral tab 70, FIG. 2, which extends outwardly through an arcuate slot 72 in the wall 16 and is alternately engageable with the slot ends to set the limit positions of the sensor. The sensor 68 is frictionally driven by the one end plate 32 under the bias of a Belleville washer 74, FIG. 3, between the sensor and wall 16. The sensor 68 includes a pair of peripherally spaced peripherally extending shoulders, not shown, which are generally the same as the shoulder 56, although of lesser axial extent and greater radial extent. These shoulders alternately engage the pawl 58 when the sensor is at its limit positions to block clockwise movement of the pawl, as viewed in FIG. 2, and thereby locate the pawl teeth out of the path of the teeth 60 of the reel end plates 32.

When the belt is in a fully retracted position as shown, the sensor 68 is at one of its limit positions. One of the shoulders of the sensor 68 engages the pawl 58 to locate the pawl in its position as shown in FIG. 2 wherein the pawl and shoulder 56 are spaced and the pawl teeth are out of the path of the shoulders 60 of the reel end plates. As a predetermined length of the belt portion 24 is initially extended, the sensor 50 is driven clockwise through the gears 36 and 46 so that the shoulder 56 moves past the pawl 58 and does not block clockwise movement of the pawl. However, during this initial extension of the belt portion 24, the sensor 68 is rotated from its one limit position shown in FIG. 2 to its other limit position wherein tab 70 engages the other end of slot 72 and the other shoulder of the sensor blocks any clockwise movement of the pawl. Thereafter upon slight retraction of the belt portion 24, the sensor 68 moves to a position intermediate its limit positions so that the pawl 58 is located between the sensor shoulders and rotates clockwise under the action of spring 62 to locate the pawl teeth in the path of the teeth 60. A subsequent slight extension of the belt portion 24 engages a pair of the teeth 60 with the pawl teeth to block any further extension of the belt portion while permitting full or partial retraction of the belt portion. The foregoing retractor which has been described is well known to those skilled in the retractor art and is also embodied in a commercially used retractor.

In accordance with this invention, the cover 44 of the housing 42 is provided on its inner surface with two groups 76 and 78 of arcuately extending contact strips. The strips are secured to the cover 44 in any suitable manner. The strips of each group are spaced radially of each other coaxially of sensor 50 while the groups are spaced circumferentially of each other. The strips of each group provide switches interrupting or completing seat belt responsive circuits in accordance with the length of belt portion 24 extended from the retractor 10, as will be described.

As best shown in FIG. 2, the sensor 50 is provided with an internal ring 80 of conducting material which may be snapped in place or otherwise secured thereto and which includes three lanced reversely bent contact fingers 82, 84, and 86 extending toward cover 44 for engagement with respective strips of groups 76 and 78. The finger 82 is spaced the same radial distance from the axis of sensor 50 as the strips 88 of group 76 and 90 of group 78 for alternate engagement therewith; the finger 84 is spaced the same radial distance as the strips 92 of group 76 and 94 of group 78 for alternate engagement therewith, and the finger 86 is spaced the same radial distance as strip 96 of group 78. When the fingers 82 and 84 engage the strips 88 and 92, a switch is provided completing a circuit across such strips. When the fingers 82, 84, and 86, respectively, engage the strips 90, 94, and 96, two switches are provided, one completing a circuit across strips 90 and 94, and the other completing a circuit across strips 90 and 96. The number of strips will, of course, depend on the number of circuits to be completed by the respective switches.

Copending application Ser. No. 206,403, Gregory E. Bell, Seat Belt Warning System, filed Dec. 9, 1971, now U.S. Pat. No. 3,740,711 and assigned to the assignee of this invention, discloses various circuits responsive to the seated presence of the driver and front seat passengers as well as the buckled or unbuckled condition of lap belts for such vehicle occupants for giving a visual and audible signal when the driver places the transmission in a drive position and the lap belts of any of the seated occupants are unbuckled, and also giving a visual and audible signal when a seat position is unoccupied but the lap belt therefor is buckled. This latter condition results from the driver or passenger buckling the lap belt behind him rather than wearing the belt, or tying a knot in one of the belt portions after it has been extended. The switches provided by the groups 76 and 78 and the contact fingers 82, 84, and 86 are particularly intended for use as the "Fastened-Unfastened" switches in the circuits disclosed in Bell, although they may be used in other seat belt responsive systems as will be apparent to those skilled in the art.

Figure 4:
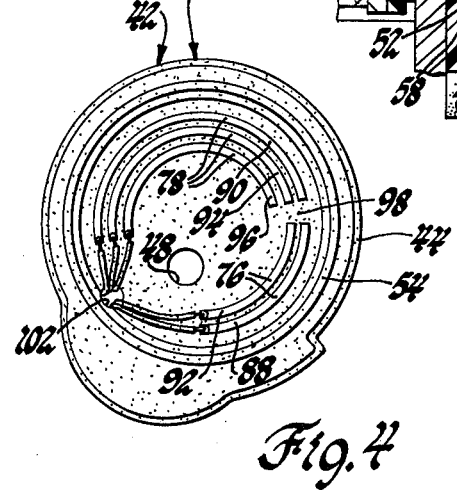
FIG. 4 is a view taken generally along the plane indicated by line 4—4 of FIG. 3.

When the belt portion 24 is in a fully retracted position, the fingers 82 and 84 respectively slidably engage the strips 88 and 92 adjacent the left-hand ends thereof, as viewed in FIG. 4, to provide the "unfastened belt condition switch" for the driver. The strip 88 provides one stationary contact of such switch, such as the contact 30 in Bell. The fingers 82 and 84 provide the movable contact of such switch, such as the contact 36 in Bell.

The strip 88 is in series with the occupied position of the seat switch for the driver, such as the switch 24, in Bell; the drive positions of the transmission selector switch, such as the switch 14 in Bell; and the vehicle battery such as the battery 10 in Bell. The strip 92 provides the other stationary contact of the unfastened belt condition switch, such as the contact 30' in Bell. Strip 92 is in series with a warning buzzer, such as the buzzer 38 in Bell, which is grounded; and is also in parallel with a grounded light which illuminates a sign reading "fasten seat belts." Thus, if the transmission is placed in a drive position, R, D or L, and the driver has not fastened or buckled the lap belt portion 24 to the other lap belt portion, the unfastened belt condition switch is closed, the buzzer sounds, and the fasten seat belt sign will be illuminated as the fingers 82 and 84 complete the circuit across the strips 88 and 92. In order to open the unfastened belt condition switch, the driver must extend the lap belt portion 24 to a sufficient length to drive or rotate the sensor 50 in a clockwise direction as viewed in FIG. 2 through an arc sufficient to move the fingers 82 and 84 off the strips 88 and 92, and either onto the null point 98 or onto the strips 90 and 94. The strips 88 and 92 are of a predetermined arcuate length and require that the lap belt position 24 must be extended a predetermined length before the unfastened seat belt condition switch is opened. This length is less than that required in order to buckle the lap belt portion 24 to the other lap belt portion. As will be apparent from a further description, the null point 98 provides a changeover between the unfastened belt condition switch and the fastened belt condition switch and prevents arcing between the fingers and the contact strips as the fingers move from one switch to the other.

The strip 90 provides one stationary contact of the fastened belt condition switch, such as the contact 34 in Bell. This strip is in series with the unoccupied position of the seat switch for the driver, and the battery. The strip 94 provides another stationary contact of this switch, such as the contact 34 in Bell. This strip would be in series with a grounded light which illuminates a sign reading "un." This sign is next to the aforementioned fasten seat belts sign. If both lights are illuminated, the sign reads unfasten seat belts and if only the former light is illuminated, the sign reads fasten seat belts. The strip 96 provides a third stationary contact of the fastened seat belt condition switch, such as contact 34' in Bell. This strip would be in series with the aforementioned warning buzzer, which is also in series with the strip 92, and also in parallel with the grounded light which illuminates the fasten seat belts sign, as in the strip 92.

If the driver has extended the lap belt portion 24 and buckled or fastened this lap belt portion to the other lap belt portion behind him, rather than around him, or has extended the lap belt portion 24 a sufficient length to open the unfastened belt condition switch and has then tied a knot in such lap belt portion, the driver can, of course, place the transmission selector switch in a drive position and drive without any audible or visible warning. Should the driver thereafter leave his seat, the seat switch will move to the unoccupied position which is in series with the vehicle battery. When the seat switch is in this position, a circuit will be completed by the fingers 82, 84 and 86 from the strip 90 to the strips 94 and 96. This will actuate the warning buzzer and the lights which illuminate the sign unfasten seat belts such that the driver will be reminded to unfasten the lap belt portion 24 before he leaves the vehicle. If the driver ignores this reminder, the drain on the battery may prevent him from starting the vehicle the next time he enters the vehicle such that he will thereafter remember that he must unfasten the lap belt portion 24 before he leaves the vehicle.

As shown in FIGS. 1 and 4, a wiring harness 100 projects through an opening 102 in cover 42 and the individual wires thereof are connected to the various strips 88, 90, 92, 94 and 96 to provide the switches 76 and 78.

Although the foregoing description is in reference to the driver, it will be understood, of course, that additional circuits can be provided for as many passenger seating positions as desired. Of course, for each such seating position, an outboard retractor, such as the retractor 10 described herein, will have to be provided.

It should be noted that although the retractor 10 has been shown and described herein in conjunction with a particular number of switches, any number of switches may be provided in accordance with the invention by arranging various groups of contact strips on the cover 44 of the retractor.

Thus, this invention provides a seat belt retractor switch which completes and interrupts seat belt condition responsive circuits in accordance with the length of belt extended from the retractor.

I claim:

1. In a seat belt retractor including support means, reel means including ratchet means, means mounting the reel means on the support means for rotational movement in belt extending and retracting directions relative thereto, means biasing the reel means in a retracting direction relative to the support means, belt means mounted on the reel means for movement therewith, pawl means, means mounting the pawl means on the support means for movement into and out of engagement with the ratchet means to selectively and alternately block movement of the reel means in an extending direction or permit such movement, means normally biasing the pawl means into engagement with the ratchet means, sensor means blocking movement of the pawl means into engagement with the ratchet means, means rotatably mounting the sensor means on the support means, means operatively connecting the sensor means to the reel means for moving the sensor means relative to the pawl means upon rotational movement of the reel means through a predetermined arc in a belt extending direction, seat belt responsive circuit means including a source of power and a plurality of switch contacts of predetermined length, means mounting the switch contacts on the support means in spaced relationship to each other, and switch contact means mounted on the sensor means and movable along the switch contacts on said support means during rotational movement of the sensor means by the reel means for completing the seat belt responsive circuit means.

2. In a seat belt retractor including support means, reel means including ratchet means, means mounting the reel means on the support means for rotational movement in belt extending and retracting directions relative thereto, means biasing the reel means in a retracting direction relative to the support means, belt means mounted on the reel means for movement therewith, pawl means, means mounting the pawl means on the support means for movement into and out of engagement with the ratchet means to selectively and alternately block movement of the reel means in an extending direction or permit such movement, means normally biasing the pawl means into engagement with the ratchet means, sensor means blocking movement of the pawl means into engagement with the ratchet means, means rotatably mounting the sensor means on the support means, means operatively connecting the sensor means to the reel means for moving the sensor means relative to the pawl means upon rotational movement of the reel means in a belt extending direction, seat belt responsive circuit means including a source of power and a plurality of arcuate switch contacts of predetermined length, means mounting the switch contacts on the support means in spaced relationship to each other and coaxially of the sensor means, and switch contact means mounted on the sensor means and movable along the arcuate contacts during rotational movement of the sensor means by the reel means for completing the seat belt responsive circuit means.

3. In a seat belt retractor including support means, reel means including ratchet means, means mounting the reel means on the support means for rotational movement in belt extending and retracting directions relative thereto, means biasing the reel means in a retracting direction relative to the support means, belt means mounted on the reel means for movement therewith, pawl means, means mounting the pawl means on the support means for movement into and out of engagement with the ratchet means to selectively and alternately block movement of the reel means in an extending direction or permit such movement, means normally biasing the pawl means into engagement with the ratchet means, sensor means blocking movement of the pawl means into engagement with the ratchet means, means rotatably mounting the sensor means on the support means, means operatively connecting the sensor means to the reel means for moving the sensor means relative to the pawl means upon rotational movement of the reel means through a predetermined arc in a belt extending direction, seat belt responsive circuit means including a source of power and a plurality of arcuate switch contacts of predetermined length, means mounting the switch contacts on the support means in spaced coaxial relationship to each other and to the sensor means, and switch contact means mounted on the sensor means and movable along the arcuate contacts during rotational movement of the sensor means by the reel means through the predetermined arc for completing the seat belt responsive circuit means.

4. In a seat belt retractor including support means, reel means including ratchet means, means mounting the reel means on the support means for rotational movement in belt extending and retracting directions relative thereto, means biasing the reel means in a retracting direction relative to the support means, belt means mounted on the reel means for movement therewith, pawl means, means mounting the pawl means on the support means for movement into and out of engagement with the ratchet means to selectively and alternately block movement of the reel means in an extending direction or permit such movement, means normally biasing the pawl means into engagement with the ratchet means, sensor means blocking movement of the pawl means into engagement with the ratchet means, means rotatably mounting the sensor means on the support means, means operatively connecting the sensor means to the reel means for moving the sensor means relative to the pawl means upon rotational movement of the reel means through a predetermined arc in a belt extending direction, plural seat belt responsive circuit means, each including a source of power and a plurality of switch contacts of predetermined length, means mounting the switch contacts of one circuit means on the support means in spaced relationship to each other, means mounting the switch contacts of another circuit means on the support means in spaced relationship to the contacts of the one circuit means and in spaced relationship to each other, and switch contact means mounted on the sensor means successively and movable along the contacts of the first circuit means and the contacts of the second circuit means during movement of the sensor means by the reel means for successively completing the one and then the other seat belt responsive circuit means.

5. In a seat belt retractor including support means, reel means including ratchet means, means mounting the reel means on the support means for rotational movement in belt extending and retracting directions relative thereto, means biasing the reel means in a retracting direction relative to the support means, belt means mounted on the reel means for movement therewith, pawl means, means mounting the pawl means on the support means for movement into and out of engagement with the ratchet means to selectively and alternately block movement of the reel means in an extending direction or permit such movement, means normally biasing the pawl means into engagement with the ratchet means, sensor means of dielectric material blocking movement of the pawl means into engagement with the ratchet means, housing means of dielectric material rotatably mounting the sensor means on the support means, means operatively connecting the sensor means to the reel means for moving the sensor means relative to the pawl means upon rotational movement of the reel means through a predetermined arc in a belt extending direction, seat belt responsive circuit means including a source of power and a plurality of arcuate switch contacts of predetermined length, means mounting the arcuate switch contacts on the housing means in spaced coaxial relationship to each other and to the sensor means, and contact finger means mounted on the sensor means and movable along the arcuate contacts during movement of the sensor means by the reel means for completing the seat belt responsive circuit means.

* * * * *